United States Patent [19]
Coenen

[11] 3,874,723
[45] Apr. 1, 1975

[54] OPEN ROOF STRUCTURE FOR A VEHICLE

[76] Inventor: Willem Frans Coenen, Prinses Marielann, Wassenaar, Netherlands

[22] Filed: Sept. 25, 1973

[21] Appl. No.: 400,585

[30] Foreign Application Priority Data
July 16, 1973 Netherlands.................... 7309886

[52] U.S. Cl................................. 296/137 J, 98/2.14
[51] Int. Cl.................................................. B60j 7/22
[58] Field of Search.. 296/91, 137 C, 137 D, 137 E, 296/137 F, 137 J; 98/2.14

[56] References Cited
FOREIGN PATENTS OR APPLICATIONS

| | | | |
|---|---|---|---|
| 1,149,627 | 5/1963 | Germany........................ | 296/137 F |
| 980,012 | 1/1965 | United Kingdom............. | 296/137 F |
| 534,498 | 10/1955 | Italy................................ | 296/137 E |

Primary Examiner—Albert J. Makay
Assistant Examiner—Ross Weaver
Attorney, Agent, or Firm—Sughrue, Rothwell, Mion, Zinn & Macpeak

[57] ABSTRACT

Apparatus for moving a wind breaker mounted at the front of a car roof panel back and forth between an upright position at the front of the opening provided by the car roof panel when the car roof panel is open and a tilted position located beneath the roof of the car when the car roof panel is closed. The apparatus can comprise a pivotably mounted wind breaker, a means for biasing the wind breaker upwardly towards its position extending above the roof of the car when the car roof panel is open, at least one lever pivotably connected to the wind breaker at a point thereon remote from the latter's axis of rotation, and means operatively connected to the car roof panel for forcing the lever to cause the wind breaker to pivot about its axis of rotation when the car roof panel is opened or closed.

2 Claims, 2 Drawing Figures

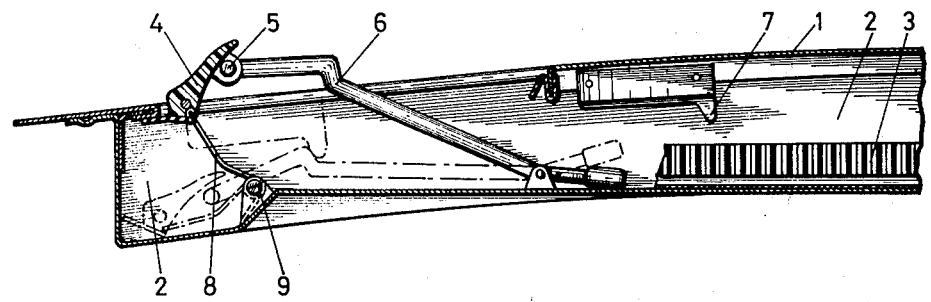
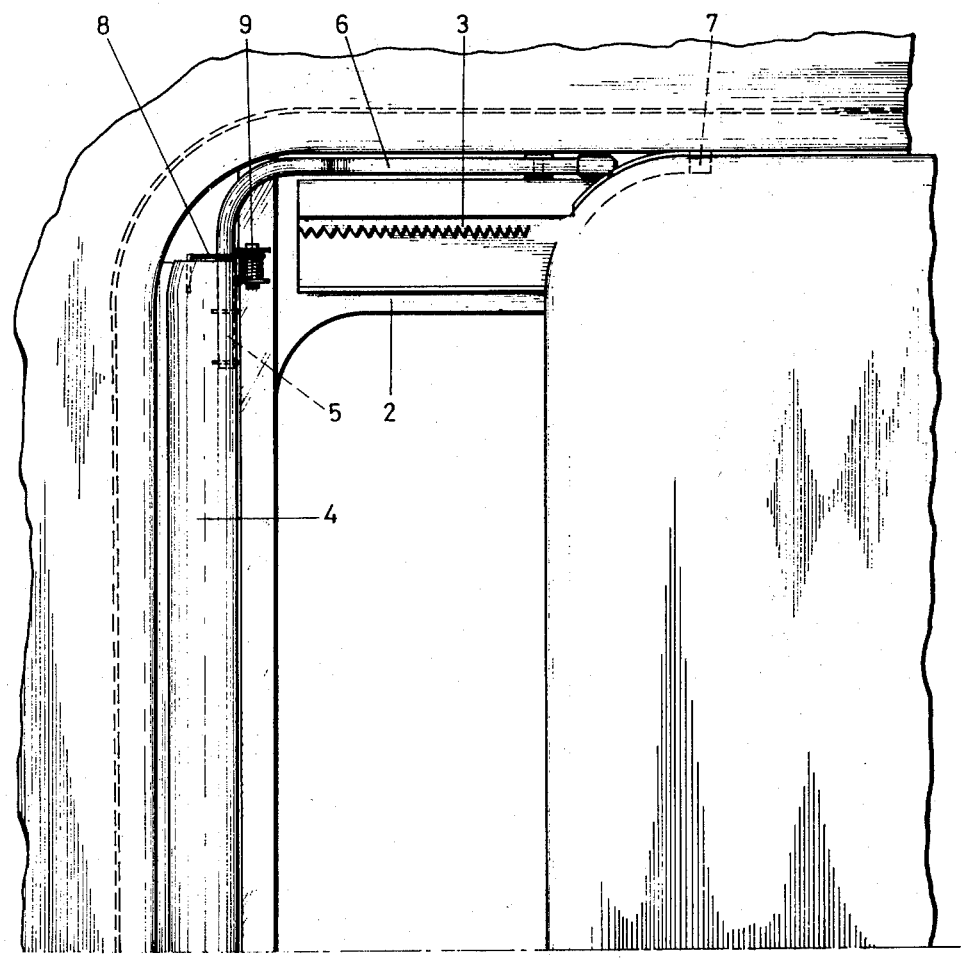

OPEN ROOF STRUCTURE FOR A VEHICLE

The present invention relates to an open roof structure for a vehicle, provided with a slidable roof panel and a wind breaker, mounted at the front side of the roof opening, which is connected with a lever which, on moving the panel in the closed position, is pressed downwardly by one or more than one cam attached to the panel, whereby the wind breaker is received in the front portion of the water channel.

In the known structures of this type the wind breaker is rigidly attached to the lever; accordingly, on moving the panel in the closed position, the wind breaker will be received in upright position in the foremost portion of the water channel, which extends transversely to the longitudinal direction of the vehicle, which water channel has to have a relatively great height as a result thereof.

It is the object of the present invention to obviate the said disadvantage and to provide an open roof structure of the type described in the preamble, in which, on closing the panel, the wind breaker is not only pressed downwardly, but is also tilted with the result that the water channel need not be constructed with a great height at that site. Such a saving of space is in practice a considerable advantage.

To this end the connection between the wind breaker and the aforesaid lever is, in accordance with the present invention, a hinged connection, the wind breaker being also connected with a hinged connection with at least one arm positioned in the water channel, which arm is adapted to rotate about a fixed point in such a manner that on pressing the aforesaid lever downwardly the wind breaker will be tilted from an upright position into a flat position.

In order to ensure that the wind breaker will be pushed up automatically when the slidable roof panel is moved into the open position, it is to be preferred that the aforesaid arm, positioned in the water channel, is connected with a helical spring.

The present invention will now be explained in more detail with reference to the annexed figures, in which an embodiment of the present invention is illustrated.

FIG. 1 shows a longitudinal sectional view of the open roof structure according to the present invention, in which the open position of the roof panel is shown with full lines and the closed position of the same is shown with chain lines.

FIG. 2 shows a top view of a part of the open roof structure according to FIG. 1.

The open roof structure for a vehicle shown in the drawing 1, comprises a roof panel 1 slidably mounted within a roof opening which is surrounded by a water channel 2.

It is possible to lock the roof panel 1 against movement in the closed position and in any desired open position owing to the fact that locking members, not shown in the drawing, engage strips 3 arranged within the water channel. Details of the said structure have been described in my U.S. patent application Ser. No. 400,610 filed at the same time as this application.

A wind breaker 4 is mounted at the front side of the roof opening, which wind breaker, in the open position of the panel 1, is destined to guide the air passing over the roof of the vehicle somewhat upwardly with as little noise as is possible.

The wind breaker 4 is connected as at 5 for a pivotal movement with two levers 6, which are mounted within the water channel 2 on either side of the roof opening. In the Figure only one lever is shown.

At the front side of the panel 1, two cams 7 are affixed (only one being shown in the drawing) which, when the panel 1 is pushed forwardly (i.e., to the left in the Figures), engage the levers 6 and push the same downwardly together with wind breaker 4. The wind breaker 4 comes to rest in the foremost portion of the water channel 2, which portion extends transversely to the longitudinal direction of the vehicle.

The wind breaker 4 is also connected for a pivotal movement with arms 8, each of which forms a portion of a helical spring 9 arranged in a fixed position within the water channel in such a manner that the arms 8 are adapted to pivot about the axis of the springs 9 against the spring action. The result of this arrangement of the wind breaker 4 is that, when the levers 6 is pushed downwardly by the cams 7, the wind breaker 4 does not only come to rest in the foremost transverse portion of the water channel 2, but it is also tilted in a flat or retracted position. Thus the water channel can be constructed with less height at this site, which means a saving in space.

It is not necessary that the arms 8 be attached to springs. A spring member for pushing the levers 6 upwardly (on opening the roof) may be mounted in another position. Further alterations are possible without departing from the scope of the claims.

What we claim is:

1. An open roof structure for a vehicle provided with a slidable roof panel and a wind breaker mounted at the front side of the roof opening, which wind breaker is connected with a lever which, on moving the panel in the closed position, is pressed downwardly by one or more than one cam affixed to the panel, whereby the wind breaker is received in the foremost portion of the water channel, characterized in that the connection between the wind breaker (4) and said lever (6) is a hinged connection and that the wind breaker (4) is also connected with a hinged connection with at least one arm (8) positioned in the water channel, which arm is adapted to rotate about a fixed point such that on pressing said lever (6) downwardly the wind breaker (4) is tilted from an upright position into a flat position.

2. An open roof structure as claimed in claim 1, characterized in that said arm (8) positioned in the water channel (2) is connected with a helical spring (9).

* * * * *